US011848573B2

United States Patent
Kang et al.

(10) Patent No.: US 11,848,573 B2
(45) Date of Patent: Dec. 19, 2023

(54) WIRELESS POWER TRANSMISSION APPARATUS AND CONTROL METHOD THEREOF

(71) Applicant: Samsung Electronics Co., Ltd., Suwon-si (KR)

(72) Inventors: Dongoh Kang, Suwon-si (KR); Jungsuk Chu, Suwon-si (KR); Sooam Kim, Suwon-si (KR); Jaejin Kim, Suwon-si (KR); Namju Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 17/697,349

(22) Filed: Mar. 17, 2022

(65) Prior Publication Data

US 2022/0329112 A1   Oct. 13, 2022

Related U.S. Application Data

(63) Continuation of application No. PCT/KR2022/001864, filed on Feb. 7, 2022.

(30) Foreign Application Priority Data

Apr. 8, 2021   (KR) ................. 10-2021-0045842

(51) Int. Cl.
*H02J 50/60*   (2016.01)
*H02J 50/00*   (2016.01)
(Continued)

(52) U.S. Cl.
CPC .............. *H02J 50/60* (2016.02); *H01Q 1/38* (2013.01); *H02J 50/005* (2020.01); *H02J 50/12* (2016.02);
(Continued)

(58) Field of Classification Search
CPC ..................................................... H02J 50/60
See application file for complete search history.

(56) References Cited

U.S. PATENT DOCUMENTS 9,178,376 B2   11/2015   Jung et al.
9,229,069 B2   1/2016    Hyodo
(Continued)

FOREIGN PATENT DOCUMENTS

JP   2017-139899 A   8/2017
KR   10-0928439 B1   11/2009
(Continued)

OTHER PUBLICATIONS

International Search Report of the International Searching Authority dated May 26, 2022, in connection with International Application No. PCT/KR2022/001864, 7 pages.

*Primary Examiner* — Daniel Kessie

(57) ABSTRACT

A wireless power transmission apparatus includes: a housing; a plate coupled with an upper portion of the housing; a power transmitting coil positioned inside the housing and configured to transmit wireless power to an electronic device put on the plate; a printed circuit board positioned between the plate and the power transmitting coil, and comprising at least one layer in which an antenna and a plurality of Foreign Object Detection (FOD) coils are formed; a processor electrically connected to the power transmitting coil and the printed circuit board; and a switch device configured to perform switching to a connection between the antenna and the processor or a connection between the plurality of FOD coils and the processor.

19 Claims, 13 Drawing Sheets

(51) Int. Cl.

| | | |
|---|---|---|
| *H02J 50/12* | (2016.01) | |
| *H01Q 1/38* | (2006.01) | |
| *H02J 50/80* | (2016.01) | |
| *H02J 50/40* | (2016.01) | |
| *H02J 50/90* | (2016.01) | |

(52) U.S. Cl.
CPC .......... *H02J 50/402* (2020.01); *H02J 50/80* (2016.02); *H02J 50/90* (2016.02)

(56) References Cited

U.S. PATENT DOCUMENTS

| | | |
|---|---|---|
| 9,761,928 B2 | 9/2017 | Han et al. |
| 10,361,594 B2 | 7/2019 | Huang et al. |
| 10,511,190 B2 | 12/2019 | Okamoto |
| 11,038,382 B2 | 6/2021 | Park et al. |
| 2009/0224723 A1* | 9/2009 | Tanabe ................... H02J 50/80 320/108 |
| 2014/0070765 A1* | 3/2014 | Hasegawa ............... H02J 50/60 320/108 |
| 2019/0386492 A1 | 12/2019 | Fukuzawa et al. |
| 2023/0006476 A1 | 1/2023 | Fortes Montilla et al. |

FOREIGN PATENT DOCUMENTS

| | | |
|---|---|---|
| KR | 10-1584555 B1 | 1/2016 |
| KR | 10-2018-0012962 A | 2/2018 |
| KR | 10-2018-0042578 A | 4/2018 |
| KR | 10-2018-0128882 A | 12/2018 |
| KR | 10-2019-0015953 A | 2/2019 |
| KR | 10-2019-0124474 A | 11/2019 |
| KR | 10-2063041 B1 | 1/2020 |
| WO | 2016076733 A1 | 5/2016 |
| WO | 2018144759 A1 | 8/2018 |

\* cited by examiner

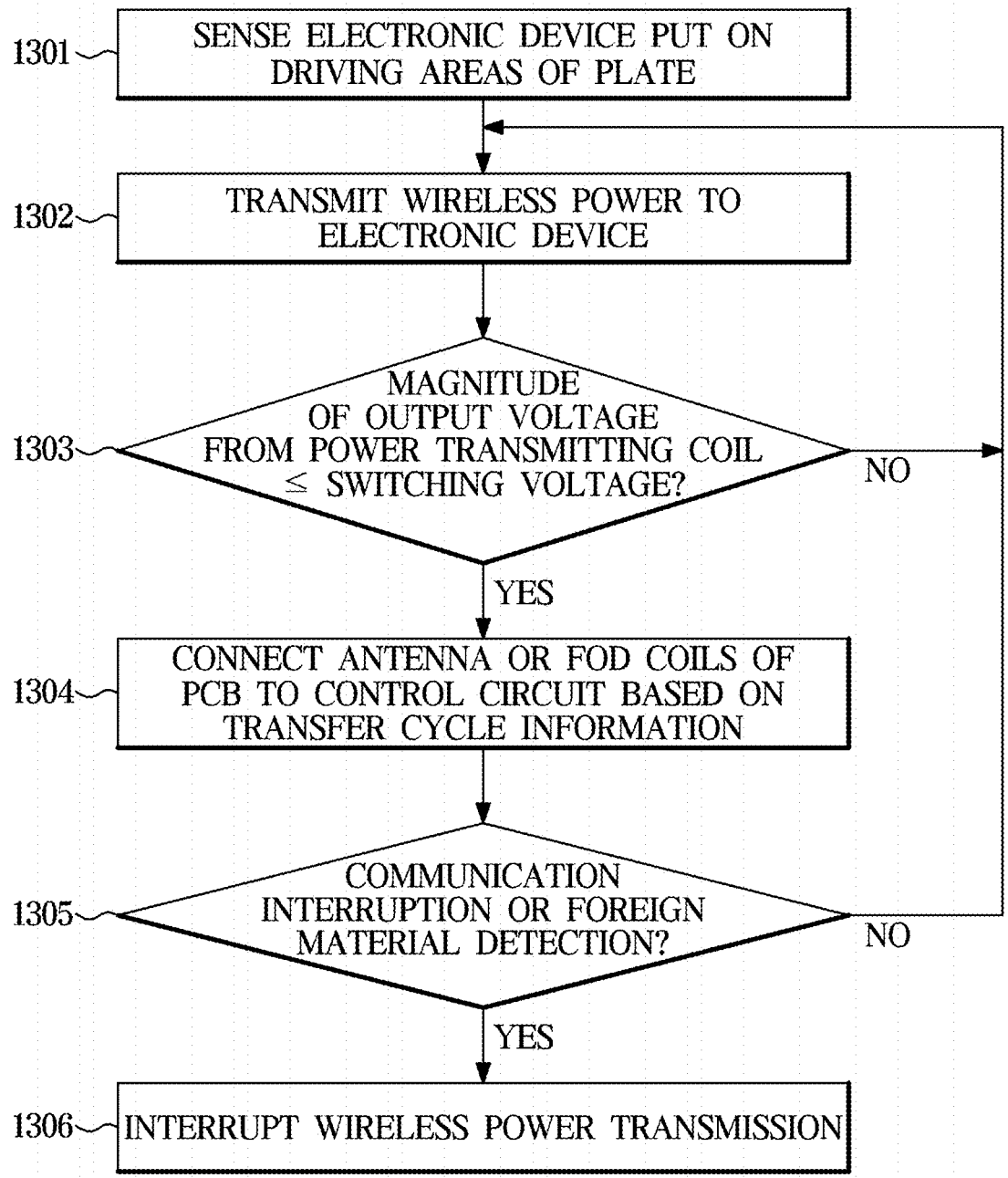

WIRELESS POWER TRANSMISSION APPARATUS AND CONTROL METHOD THEREOF

CROSS-REFERENCE TO RELATED APPLICATION

This application is a continuation of International Patent Application No. PCT/KR2022/001864 filed on Feb. 7, 2022, which is based on and claims priority under 35 U.S.C. § 119 to Korean Patent Application No. 10-2021-0045842 filed on Apr. 8, 2021, in the Korean Intellectual Property Office, the disclosures of which are herein incorporated by reference in their entirety.

BACKGROUND

1. Field

The disclosure relates to a wireless power transmission apparatus capable of supplying wireless power to an electronic device, and a method for controlling the wireless power transmission apparatus.

2. Description of the Related Art

Lately, technologies for supplying wireless power have been developed and applied to many electronic devices. Wireless power transmission technologies include a magnetic induction method using a magnetic induction phenomenon between primary coils and secondary coils, and a magnetic resonance method by which primary coils and secondary coils use the same frequency.

An electronic device to which a wireless power transmission technology is applied can receive power wirelessly without directly connecting to a charging connector. For example, a technology for providing wireless power to various home appliances by using a product such as a cooktop including an induction is being developed. A wireless power transmission apparatus that transmits wireless power communicates wirelessly with an electronic device that receives wireless power.

Meanwhile, when a foreign object such as metal exists between a wireless power transmission apparatus that transmits wireless power and an electronic device that receives wireless power, energy loss, a power transmission failure, or device damage may occur due to the foreign object. Also, when such a metal foreign object is heated, a user may be unexpectedly injured. In order to detect such a foreign object, a wireless power transmission apparatus includes Foreign Object Detection (FOD) coils.

SUMMARY

Therefore, it is an aspect of the disclosure to provide a wireless power transmission apparatus including a structure in which an antenna for communicating with an electronic device and Foreign Object Detection (FOD) coils for detecting a foreign object are formed together on a printed circuit board, and a method for controlling the wireless power transmission apparatus.

Additional aspects of the disclosure will be set forth in part in the description which follows and, in part, will be obvious from the description, or may be learned by practice of the disclosure.

A wireless power transmission apparatus according to an embodiment of the disclosure includes: a housing; a plate coupled with an upper portion of the housing; a power transmitting coil positioned inside the housing and configured to transmit wireless power to an electronic device that is positioned on the plate; a printed circuit board positioned between the plate and the power transmitting coil, and comprising at least one layer in which an antenna and a plurality of Foreign Object Detection (FOD) coils are formed; a processor electrically connected to the power transmitting coil and the printed circuit board; and a switch configured to form a first connection between the antenna and the processor or form a second connection between the plurality of FOD coils and the processor.

The printed circuit board may include a substrate, the plurality of FOD coils may be formed as an array pattern in an upper layer of the substrate, and the antenna may be formed outside a first area at which the plurality of FOD coils are formed, in the upper layer of the substrate.

The printed circuit board may further include: a first terminal to which the plurality of FOD coils are connected; and a second terminal to which the antenna is connected, wherein the switch may be connectable to the first terminal or the second terminal.

The processor may be connected to the first terminal or the second terminal by controlling the switch based on whether a magnitude of an output voltage from the power transmitting coil is smaller than a predefined switching voltage.

The processor may be connected to the first terminal or the second terminal by controlling the switch, based on transfer cycle information stored in a memory.

The processor may determine a communication state with respect to the electronic device based on a communication signal received through the antenna, and determine an interruption of wireless power transmission to the electronic device, based on an interruption of communication with the electronic device.

The processor may determine an interruption of wireless power transmission to the electronic device, based on a change of an output voltage or an output current from the plurality of FOD coils.

Each of the plurality of FOD coils may be formed in a shape of a circle or a polygon, may have a smaller size than a size of the power transmitting coil, and may be formed at the first area having a size that is smaller than or equal to an area of the power transmitting coil.

The antenna may be formed in a shape of a circle or a polygon, and may be formed at a second area spaced from the first area.

The wireless power transmission apparatus may further include an insulating sheet provided between the printed circuit board and the power transmitting coil or between the printed circuit board and the plate.

The printed circuit board may include: a substrate; a plurality of first Foreign Object Detection (FOD) coils formed as an array pattern in an upper layer of the substrate; a first antenna formed outside a first area at which the plurality of first FOD coils are formed, in the upper layer of the substrate; a plurality of second FOD coils formed as an array pattern in a lower layer of the substrate, in such a way as to overlap with a plurality of gaps between the plurality of first FOD coils; and a second antenna formed outside a second area at which the plurality of second FOD coils are formed, in the lower layer of the substrate.

The printed circuit board may further include: a first terminal through which the plurality of first FOD coils are connected to the plurality of second FOD coils; and a second terminal through which the first antenna is connected to the second antenna, wherein the switch may connect to the first terminal or the second terminal.

A method for controlling a wireless power transmission apparatus, according to an embodiment of the disclosure, the wireless power transmission apparatus including a plate, a power transmitting coil, and a printed circuit board provided between the plate and the power transmitting coil, includes: sensing an electronic device that is positioned on a driving area of the plate; transmitting wireless power to the electronic device by using the power transmitting coil; and controlling a switch to connect to an antenna or a plurality of Foreign Object Detection (FOD) coils formed in at least one layer of the printed circuit board, based on a magnitude of an output voltage from the power transmitting coil.

The controlling of the switch may include performing switching to a connection between the antenna and a processor or a connection between the plurality of FOD coils and the processor, in a case in which a magnitude of an output voltage from the power transmitting coil is smaller than a predefined switching voltage.

The controlling of the switch may include performing switching to a connection between the antenna and a processor or a connection between the plurality of FOD coils and the processor, based on pre-stored transfer cycle information.

The method for controlling the wireless power transmission apparatus, according to an embodiment of the disclosure, may further include: determining, in a case in which the switch is connected to the antenna, a communication state with respect to the electronic device based on whether a communication signal is received through the antenna; and interrupting wireless power transmission to the electronic device based on an interruption of communication with the electronic device.

The method for controlling the wireless power transmission apparatus, according to an embodiment of the disclosure, may further include interrupting, in a case in which the switch is connected to the plurality of FOD coils, wireless power transmission to the electronic device based on a change of an output voltage or an output current from the plurality of FOD coils.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates a flowchart for describing a control method of a wireless power transmission apparatus according to an embodiment of the disclosure.

DETAILED DESCRIPTION

Figure 1:
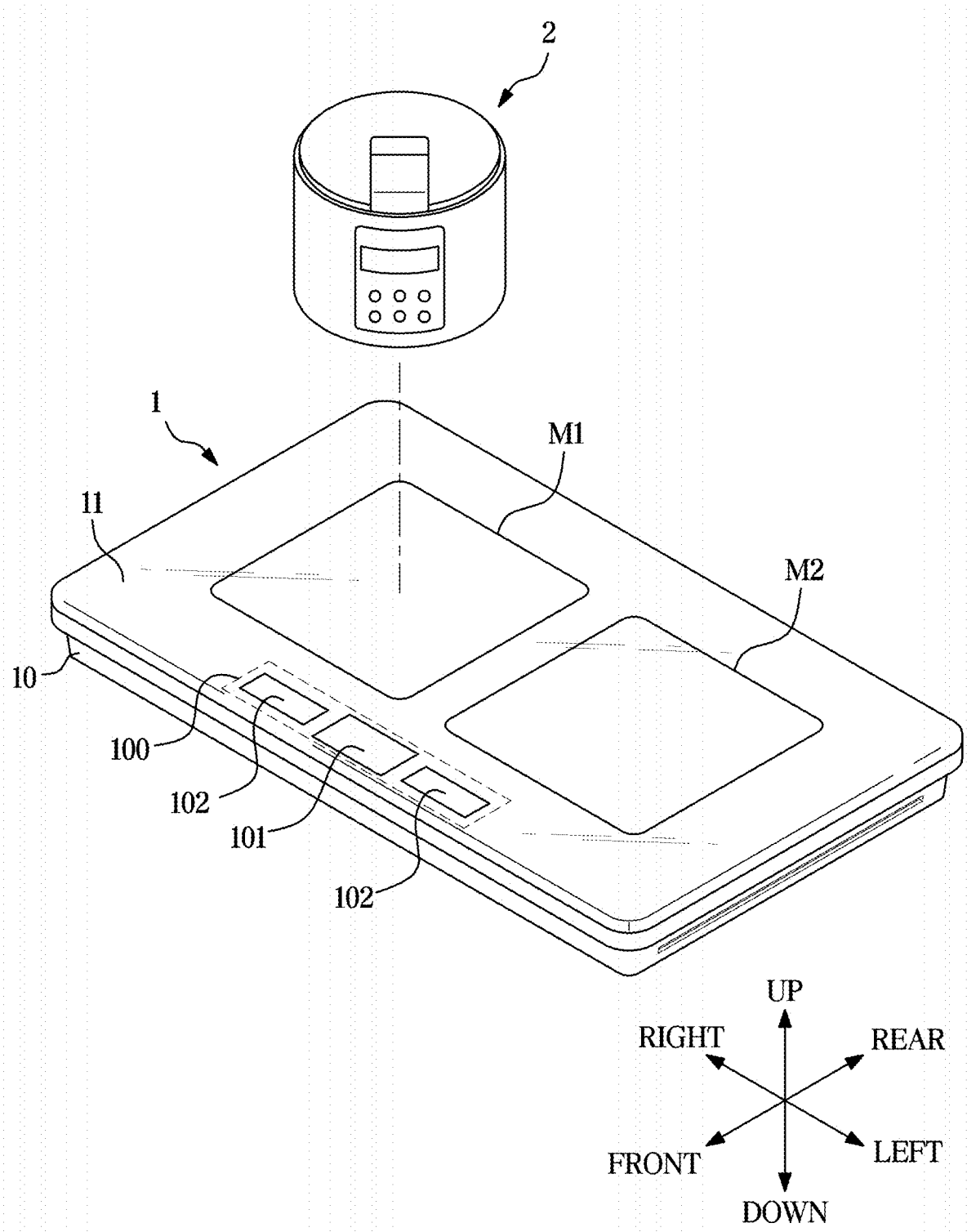
FIG. 1 illustrates a wireless power system including a wireless power transmission apparatus according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like reference numerals will refer to like components throughout this specification. This specification does not describe all components of the embodiments, and general information in the technical field to which the disclosure belongs or overlapping information between the embodiments will not be described. As used herein, the terms "portion", "part, "module, "member" or "block" may be implemented as software or hardware, and according to embodiments, a plurality of "portions", "parts, "modules, "members" or "blocks" may be implemented as a single component, or a single "portion", "part, "module, "member" or "block" may include a plurality of components.

It will be understood that when a certain part is referred to as being "connected" to another part, it can be directly or indirectly connected to the other part. When a certain part is indirectly connected to another part, it may be connected to the other part through a wireless communication network or electrically connected to the other part through electrical wirings.

The terms used in the present specification are used to describe the embodiments, not for the purpose of limiting and/or restricting the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, in the specification, it will also be understood that the terms including ordinal numbers such as "first" and "second" are used to distinguish a plurality of components from each other, not to represent an arrangement, a manufacturing order, importance, etc. of the components. The term "and/or" includes any and all combinations of one or more of associated listed items.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings.

Figure 2:
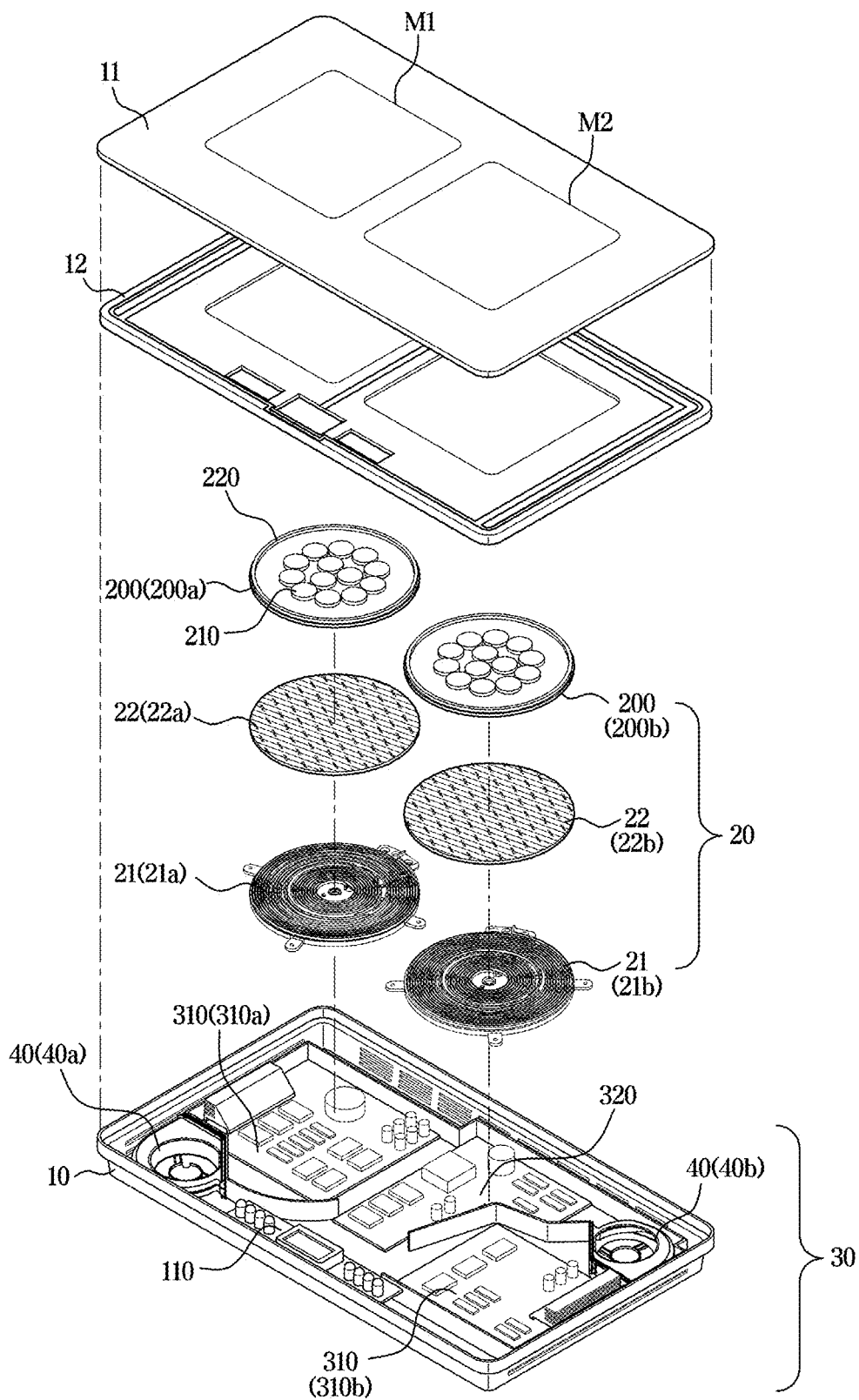
FIG. 2 illustrates an exploded view of a wireless power transmission apparatus according to an embodiment of the disclosure.

FIG. 1 illustrates a wireless power system including a wireless power transmission apparatus according to an embodiment of the disclosure. FIG. 2 illustrates an exploded view of a wireless power transmission apparatus according to an embodiment of the disclosure.

Referring to FIG. 1, a wireless power system may include a wireless power transmission apparatus 1 and an electronic device 2. The wireless power transmission apparatus 1 may supply wireless power to the electronic device 2 capable of receiving wireless power. After the electronic device 2 is put on driving areas M1 and M2 provided in a plate 11 of the wireless power transmission apparatus 1, the wireless power transmission apparatus 1 may transmit wireless power to the electronic device 2.

The wireless power transmission apparatus 1 may be provided in various shapes. For example, the wireless power transmission apparatus 1 may be provided in a shape of a plate, as shown in FIG. 1. The wireless power transmission apparatus 1 may be provided in a shape of a table. The wireless power transmission apparatus 1 may be installed in various places where an external power source exists.

Also, the electronic device 2 may include various electronic devices. For example, the electronic device 2 may be an electric rice cooker, an electric toaster, an electric blender, or a coffee maker. A bottom of the electronic device 2 being in contact with the plate 11 may have a flat surface.

The wireless power transmission apparatus 1 may transmit wireless power to the electronic device 2 by using a wireless power transmission technology based on a known magnetic induction method or a known magnetic resonance method. The magnetic induction method may be a method of changing a magnetic field of a plurality of power transmitting coils 21 (See FIG. 3) to induce a voltage in a power receiving coil 410 (see FIG. 5) and thereby causing a current to flow through a secondary coil. The magnetic resonance method may be a method for causing a resonance phenomenon in the power transmitting coils 21 and the power receiving coil 410 by using the same resonance frequency and transferring power by the resonance phenomenon.

Also, upon putting of a cooking container (such as the electronic device 2) being placed on the plate 11, the wireless power transmission apparatus 1 may heat the cooking container. According to application of a current to the power transmitting coils 21, a magnetic field induced in the power transmitting coils 21 may pass through a bottom of the cooking container, and an eddy current rotating with respect to the magnetic field may be generated in the inside of the bottom of the cooking container. The cooking container may be heated by the edge current.

On an upper surface of the plate 11, the driving areas M1 and M2 through which the electronic device 2 receives wireless power may be provided. The driving areas M1 and M2 may be respectively provided at locations corresponding to the power transmitting coils 21 which will be described below. In FIG. 1, two driving areas M1 and M2 are shown. However, three driving areas or more may be provided. The power transmitting coils 21 may be positioned at locations respectively corresponding to the plurality of driving areas M1 and M2. The driving areas M1 and M2 may be divided into a first driving area M1 and a second driving area M2.

The wireless power transmission apparatus 1 may be connected to an external mobile device (not shown). The wireless power transmission apparatus 1 may be connected to the external mobile device (not shown) through wireless communication. After the wireless power transmission apparatus 1 is connected to the external mobile device (not shown), information about operations of the wireless power transmission apparatus 1 may be transmitted to the external mobile device (not shown). Also, the wireless power transmission apparatus 1 may be controllable by the external mobile device (not shown). A user may control the wireless power transmission apparatus 1 by using the external mobile device (not shown).

Referring to FIG. 2, the wireless power transmission apparatus 1 may include a housing and the plate 11. The housing may be divided into a lower housing 10 and an upper housing 12. The upper housing 12 may be coupled with the lower housing 10, and the plate 11 may be coupled with the upper housing 12. The lower housing 10, the upper housing 12, and the plate 11 may be made of various materials. For example, the plate 11 may be made of tempered glass such as ceramic glass.

The plate 11 may receive a user input, and include a user interface 100 that displays information about operations of the wireless power transmission apparatus 1. For example, the user may operate the wireless power transmission apparatus 1 by using the user interface 100. The user interface 100 may be positioned at various locations of the wireless power transmission apparatus 1. In FIGS. 1 and 2, the user interface 100 may be positioned on the upper surface of the plate 11. The user interface 100 may be positioned on a front surface, a rear surface, a left surface, or a right surface of the wireless power transmission apparatus 1.

Referring to FIG. 2, the wireless power transmission apparatus 1 may include a coil assembly 20 and a driving assembly 30. The coil assembly 20 and the driving assembly 30 may be positioned between the upper housing 12 and the lower housing 10, and accommodated in the lower housing 10.

The coil assembly 20 may include the power transmitting coils 21 and a plurality of printed circuit boards 200. The coil assembly 20 may further include a plurality of insulating sheets 22. The insulating sheets 22 may be positioned between the printed circuit boards 200 and the power transmitting coils 21 and/or between the printed circuit boards 200 and the plate 11.

One or more power transmitting coils 21 may be provided. For example, the power transmitting coils 21 may include a first power transmitting coil 21a and a second power transmitting coil 21b. The power transmitting coils 21 may be positioned at locations respectively corresponding to the driving areas M1 and M2. The first driving area M1 may be positioned above the first power transmitting coil 21a, and the second driving area M2 may be positioned above the second power transmitting coil 21b.

The first power transmitting coil 21a and the second power transmitting coil 21b may output the same power or different power. The first power transmitting coil 21a and the second power transmitting coil 21b may be driven independently under a control of a processor 324 (see FIG. 4) included in a control circuit 320. The power transmitting coils 21 may generate a magnetic field and/or an electromagnetic field based on a voltage and/or current applied from a driving circuit 310, and transmit wireless power to the electronic device 2.

The printed circuit boards 200 may be positioned between the plate 11 and the power transmitting coils 21. Each printed circuit board 200 may include at least one layer in which an antenna 220 and a plurality of FOD coils 210 are formed. The printed circuit board 200 is also referred to as an 'integrated printed circuit board'. The printed circuit board 200 may be electrically connected to the control circuit 320. More specifically, the antenna 220 and the plurality of FOD coils 210 formed in the printed circuit board 200 may be electrically connected to the control circuit 320. The printed circuit board 200 may be implemented as a flexible printed circuit board.

The driving assembly 30 may include a fan 40, a user interface circuit 110, the driving circuit 310, and the control circuit 320. The driving assembly 30 may be accommodated in the lower housing 10. The user interface circuit 110, the driving circuit 310, and the control circuit 320 may be provided as separate circuit boards, or integrated into a single circuit board.

The fan 40 may circulate heat generated in the inside of the wireless power transmission apparatus 1, and discharge heat to the outside of the wireless power transmission apparatus 1. The processor 324 of the control circuit 320 may control a rotation of the fan 40. One or more fans 40 may be provided. For example, the number of the fans 40 may be the same as that of the power transmitting coils 21. FIG. 2 shows a case in which the fans 40 include a first fan 40a and a second fan 40b. The first fan 40a may be positioned below the first power transmitting coil 21a, and the second fan 40b may be positioned below the second power transmitting coil 21b.

The user interface circuit 110 may be a circuit board including a display panel and various circuit devices for implementing the user interface 100 that is shown in an outer appearance of the wireless power transmission apparatus 1.

The driving circuit 310 may be electrically connected to the control circuit 320, and apply a current to the power transmitting coils 21. One or more driving circuits 310 may be provided. For example, the number of the driving circuits 310 may be the same as that of the power transmitting coils 21. A first driving circuit 310a may apply a current to the first power transmitting coil 21a, and a second driving circuit 310b may apply a current to the second power transmitting coil 21b. Unlike this, a single driving circuit 310 may apply a current to the plurality of power transmitting coils 21.

The control circuit 320 may be electrically connected to configurations of the wireless power transmission apparatus 1. The control circuit 320 may include a switch 321, a communication module 322, a memory 323, and the processor 324 (see FIG. 4). The processor 324 may be electrically connected to the configurations of the wireless power transmission apparatus 1, and control operations of the configurations. The configurations of the control circuit 320 will be described in detail with reference to FIG. 4.

Figure 3:
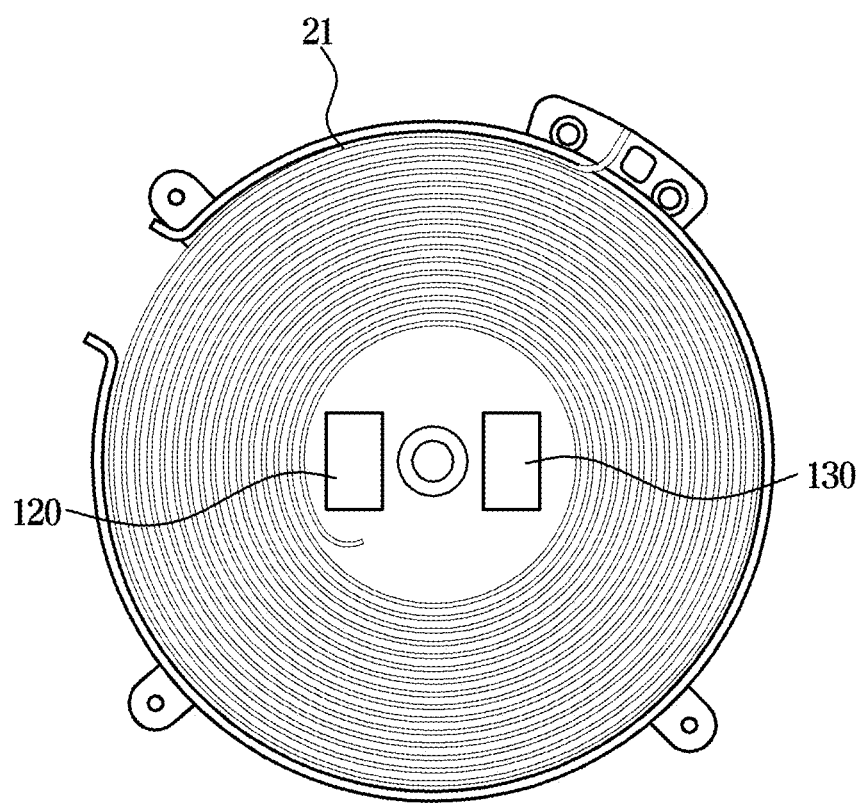
FIG. 3 illustrates a power transmitting coil, a device sensor, and a temperature sensor included in a wireless power transmission apparatus according to an embodiment of the disclosure.

FIG. 3 illustrates a power transmitting coil, a device sensor, and a temperature sensor included in a wireless power transmission apparatus according to an embodiment of the disclosure.

Referring to FIG. 3, the coil assembly 20 may include a device sensor 120 and a temperature sensor 130. For example, the device sensor 120 and the temperature sensor 130 may be positioned at a center of each power transmitting coil 21. Also, the device sensor 120 and the temperature sensor 130 may be positioned around the power transmitting coil 21.

The device sensor 120 may sense the electronic device 2 put on the driving areas M1 and M2 of the plate 11. The device sensor 120 may include a capacitive sensor capable of sensing a change of capacitance caused by the electronic device 2. Also, the device sensor 120 may include at least one of an infrared sensor, a weight sensor, a micro switch, or a membrane switch. However, the device sensor 120 may include other various sensors.

The temperature sensor 130 may measure temperature of the plate 11, temperature of the power transmitting coil 21, and/or inside temperature of the lower housing 10. The temperature sensor 130 may include a thermistor of which an electrical resistance value changes according to temperature. The temperature sensor 130 may transmit temperature data to the processor 324 of the control circuit 320, and the processor 324 may determine overheating based on the temperature data. For example, upon overheating of the plate 11, the processor 324 may control the driving circuit 310 to interrupt wireless power transmission by the power transmitting coil 21.

Figure 4:
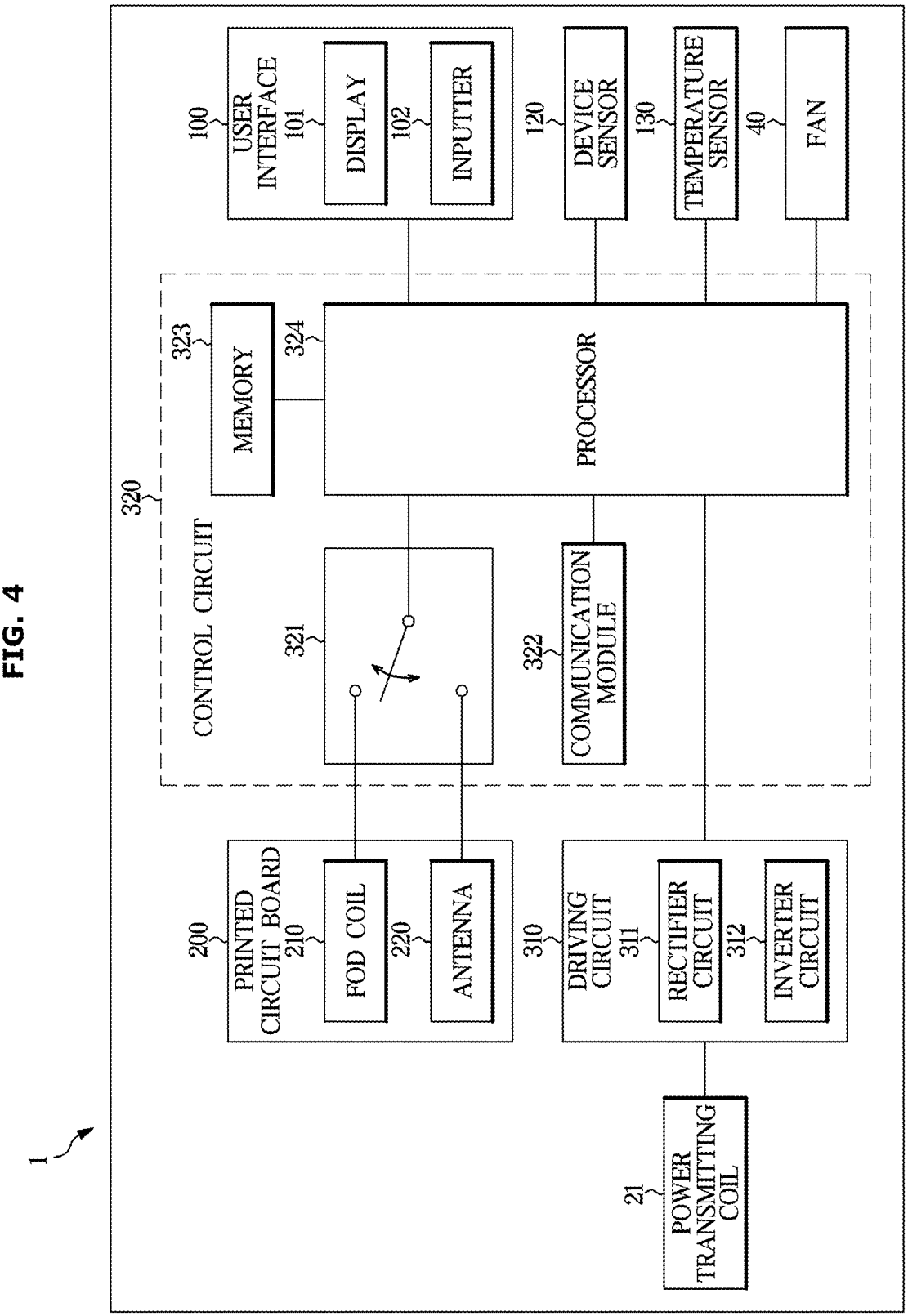
FIG. 4 illustrates a control block diagram of a wireless power transmission apparatus according to an embodiment of the disclosure.

FIG. 4 illustrates a control block diagram of a wireless power transmission apparatus according to an embodiment of the disclosure.

Referring to FIG. 4, the wireless power transmission apparatus 1 according to an embodiment of the disclosure may include the fan 40, the device sensor 120, the temperature sensor 130, the power transmitting coil 21, the user interface 100, the driving circuit 310, and the control circuit 320. Also, the wireless power transmission apparatus 1 may include the printed circuit board 200 on which the FOD coils 210 and the antenna 220 are formed.

The driving circuit 310 may receive power from an external power source, rectify the power, and provide the rectified power to the power transmitting coils 21 and the control circuit 320. The control circuit 320 may distribute power transferred from the driving circuit 310 to the fan 40, the device sensor 120, the temperature sensor 130, the user interface 100, and the printed circuit board 200.

Unlike the control circuit 320, the driving circuit 310 may supply the rectified power to the power transmitting coil 21, the control circuit 320, the fan 40, the device sensor 120, the temperature sensor 130, the user interface 100, and the printed circuit board 200.

More specifically, the driving circuit 310 may include a rectifier circuit 311 and an inverter circuit 312. The rectifier circuit 311 may convert alternating current power to direct current power. The rectifier circuit 311 may convert an alternating current voltage of which a magnitude and polarity (a positive voltage or a negative voltage) change over time to a direct current voltage having a constant magnitude and constant polarity, and convert an alternating current of which a magnitude and direction (positive current or negative current) change over time to a direct current having a constant magnitude.

The rectifier circuit 311 may include a bridge diode. The rectifier circuit 311 may include four diodes. The diodes may form two diode pairs in which two diodes are serially connected to each other, and the diode pairs may be connected in parallel to each other. The bridge diode may convert an alternating current voltage of which polarity changes over time to a voltage having constant polarity, and convert an alternating current of which a direction changes over time to a positive current having a constant direction.

Also, the rectifier circuit 311 may include a DC link capacitor. The DC link capacitor may convert a positive voltage of which a magnitude changes over time to a direct current voltage having a constant magnitude. The DC link capacitor may maintain the converted direct current voltage and provide the converted direct current voltage to the inverter circuit 312.

The inverter circuit 312 may switch a voltage that is applied to the power transmitting coil 21 to cause a current to flow to the power transmitting coil 21. The inverter circuit 312 may include a resonant capacitor and a switching circuit for supplying a current to the power transmitting coil 21 or stopping supplying a current to the power transmitting coil 21. The resonant capacitor may function as a buffer, and determine a resonant frequency of the power transmitting coil 21. One end of the power transmitting coil 21 may be connected to a node of the switching circuit, and the other end of the power transmitting coil 21 may be connected to the resonant capacitor. The switching circuit may be opened or closed according to a control signal transmitted from the control circuit 320. The power transmitting coil may transmit wireless power by a switching operation (on/off) of the switching circuit.

Because the switching circuit needs to be opened or closed at high speed, the switching circuit may be implemented as a three-terminal semiconductor switch having high response speed. For example, the switching circuit may include a bipolar junction transistor (BJT), a metal-oxide-semiconductor field effect transistor (MOSFET), an insulated gate bipolar transistor (IGBT), or a thyristor.

The power transmitting coil 21 may form a magnetic field by a current applied from the inverter circuit 312. By the magnetic field, a current and a voltage may be applied to the power receiving coil 410 of the electronic device 2 positioned at the driving areas M1 and M2 of the plate 11.

In response to sensing of the electronic device 2, the device sensor 120 may transmit a sensing signal to the processor 324 of the control circuit 320. Also, in response to a user input made on a power-on button of the user interface 100, the user interface 100 may transmit a wake-up signal to the processor 324 of the control circuit 320. The processor 324 may power on the wireless power transmission apparatus 1 or switch a standby mode to an operating mode, based on the sensing signal and/or the wake-up signal.

The device sensor 120 may be omitted. In this case, the control circuit 320 may function as the device sensor 120. The control circuit 320 may detect a location of the electronic device 2, based on inductance of the power transmitting coil 21, which changes according to putting of the electronic device 2 on the driving areas M1 and M2. Inductance of the power transmitting coil 21, measured upon putting of the electronic device 2 on the driving areas M1 and M2, may be different from inductance of the power transmitting coil 21, measured upon absence of the electronic device 2 on the driving areas M1 and M2. The control circuit 320 may control the driving circuit 310 to apply a sensing current for sensing the electronic device 2 to the power transmitting coil 21. However, the electronic device 2 may be sensed by various other methods than the above-described method.

The user interface 100 may include a display 101 and an inputter 102. The inputter 102 may include at least one of a physical button, a touch button, a touch pad, a knob, a jog shuttle, a control stick, a track ball, or a track pad. Also, the user interface 100 may be provided as a touch screen into which the display 101 and the inputter 102 are integrated.

The control circuit 320 may include the switch 321, the memory 323, the communication module 322, and the processor 324.

The switch 321 may connect the antenna 220 or the FOD coils 210 formed on the printed circuit board 200 of the coil assembly 20 to the processor 324. In other words, the switch 321 may perform switching to a connection between the antenna 220 and the processor 324 or a connection between the FOD coils 210 and the processor 324.

The processor 324 may control the switch 321 based on an output voltage from the power transmitting coil 21. More specifically, the processor 324 may be selectively connected to the antenna 220 or the FOD coils 210 by controlling the switch 321, based on a magnitude of an output voltage from the power transmitting coil 21, which is smaller than a predefined switching voltage. Also, the processor 324 may be connected to the antenna 220 or the FOD coils 210 by controlling the switch 321, based on transfer cycle information of wireless power, stored in the memory 323. Meanwhile, the processor 324 may be disconnected from the antenna 220 or the FOD coils 210 while wireless power is transmitted through the power transmitting coil 21, by controlling the switch 321.

As a result of existence of a foreign object such as a metal object on the plate 11 of the wireless power transmission apparatus 1, an edge current may be induced in the foreign object upon transmission of wireless power, and power loss may be generated. Due to heating of the foreign object, power may be consumed. To detect a foreign object located on the driving areas M1 and M2 of the plate 11, the FOD coils 210 may be provided.

According to a connection of the switch 321 to the FOD coils 210, the processor 324 may determine whether a foreign object exists between the driving areas M1 and M2 of the plate 11 and the electronic device 2, based on a change of an output voltage or an output current from the FOD coils 210. In a case in which a foreign object exists, the processor 324 may determine a transmission interruption of wireless power, and control the driving circuit 310 to apply no current to the power transmitting coil 21.

A first output voltage or a first output current from the FOD coils 210, measured in a case in which a foreign object exists between the electronic device 2 and the driving areas M1 and M2 of the plate 11, may be different from a second output voltage or a second output current from the FOD coils 210, measured in a case in which no foreign object exists between the electronic device 2 and the driving areas M1 and M2 of the plate 11. In a case in which a foreign object is located close to the FOD coils 210, inductance of the FOD coils 210 may change, and accordingly, a resonance frequency may also change. In a case in which a change of an output voltage or an output current from the FOD coils 210 is greater than or equal to a predefined threshold value, the processor 324 may determine that a foreign object exists. Also, the processor 324 may determine a location of the foreign object based on a change of output voltages or output currents from the individual FOD coils 210.

Although not shown in the drawings, the control circuit 320 may include a voltage current sensor for measuring output voltages and/or output currents from the FOD coils 210.

The antenna 220 may function to transmit and receive communication signals between the wireless power transmission apparatus 1 and the electronic device 2. The antenna 220 may be electrically connected to the communication module 322 via the processor 324 of the control circuit 320. Unlike this, the antenna 220 may be directly connected to the communication module 322.

According to a connection of the switch 321 to the antenna 220, the processor 324 may determine a communication state with respect to the electronic device 2, based on a communication signal received through the antenna 220. For example, in a case in which a magnitude of the communication signal is smaller than a predefined reference value, the processor 324 may determine that communication with the electronic device 2 has been interrupted. The interruption of communication with the electronic device 2 may mean that the electronic device 2 has been removed from the plate 11. The processor 324 may determine a transmission interruption of wireless power based on the interruption of communication with the electronic device 2.

The communication module 322 may communicate with the electronic device 2. The communication module 322 may transmit a communication signal to the electronic device 2 through the antenna 220 or receive a communication signal from the electronic device 2 through the antenna 220. Also, the communication module 322 may communicate with an external mobile device (not shown).

The communication module 322 may be implemented by various wireless communication technologies. For example, at least one of Radio Frequency (RF), infrared communication, Wireless-Fidelity (Wi-Fi), Bluetooth, Zigbee, or Near Field Communication (NFC) may be applied to the communication module 322. The communication module 322 may be preferably an NFC module. The NFC module may communicate with an NFC tag included in the electronic device 2. The NFC module may function as a tag or a reader according to a situation. The communication module 322 may include a chipset to which a wireless communication technology is applied. The communication module 322 of the wireless power transmission apparatus 1 is referred to as a 'first communication module'.

The communication module 322 may transmit data to the electronic device 2 or receive data from the electronic device 2. For example, the communication module 322 may receive operation setting information of the electronic device 2 from the electronic device 2. The electronic device 2 may be driven by operation settings including an operation mode and an operation time. The operation settings of the electronic device 2 may be made by a user input or automatically.

Also, the communication module 322 may receive data about an operation state from the electronic device 2. The processor 324 of the control circuit 320 may determine a standby state, a start state, an in-progress state, or an operation termination state of the electronic device 2, based on the data about the operation state received from the electronic device 2 through the communication module 322.

The memory 323 may store programs, instructions, and data for controlling operations of the wireless power transmission apparatus 1. The processor 324 may generate a control signal for controlling operations of the wireless power transmission apparatus 1, based on the programs, instructions, and data memorized and/or stored in the memory 323. The processor 324 may include a logic circuit and an operational circuit as hardware. The processor 324 may process data according to a program and/or instruction provided from the memory 323, and generate a control signal according to a result of the processing.

Also, the memory 323 may store programs, instructions, and data for controlling operations of the electronic device 2. The processor 324 may generate a control signal for controlling operations of the electronic device 2.

The memory 323 may include a volatile memory, such as a Static Random Access Memory (SRAM) or a Dynamic Random Access Memory (DRAM), for temporarily storing data, and a non-volatile memory, such as Read Only Memory (ROM), Erasable Programmable Read Only Memory (EPROM) or Electrically Erasable Programmable Read Only Memory (EEPROM), for storing data for a long time.

The wireless power transmission apparatus 1 may further include other configurations in addition to the above-described configurations. Also, some of the above-described configurations may be omitted in the wireless power transmission apparatus 1.

Figure 5:
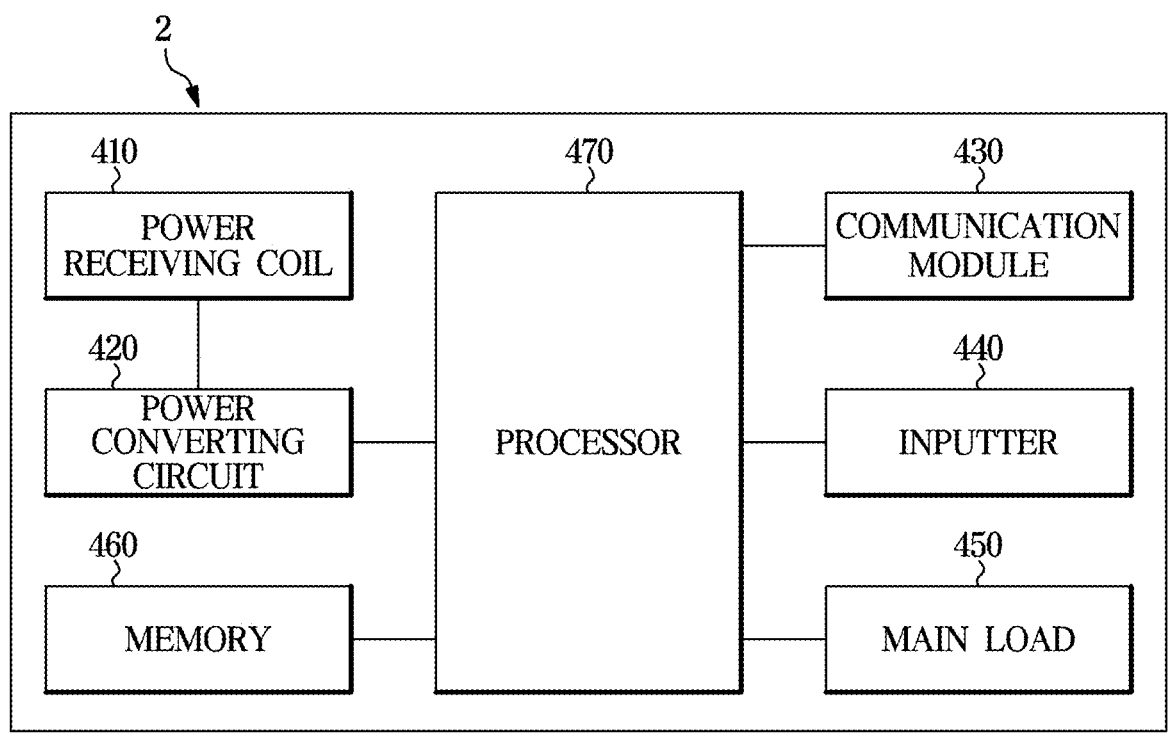
FIG. 5 illustrates a control block diagram of an electronic device that receives wireless power from a wireless power transmission apparatus according to an embodiment of the disclosure.

FIG. 5 illustrates a control block diagram of an electronic device that receives wireless power from a wireless power transmission apparatus according to an embodiment of the disclosure.

Referring to FIG. 5, the electronic device 2 may include the power receiving coil 410, a power converting circuit 420, a communication module 430, an inputter 440, a main load 450, a memory 460, and a processor 470. The power receiving coil 410 and the power converting circuit 420 may supply power to the communication module 430, the inputter 440, the main load 450, and the processor 470. Also, the processor 470 may distribute power received from the power converting circuit 420 to the communication module 430, the inputter 440, and the main load 450.

The power receiving coil 410 may receive power from the power transmitting coil 21 of the wireless power transmission apparatus 1. According to putting of the electronic device 2 on the driving areas M1 and M2 provided on the plate 11 of the wireless power transmission apparatus 1, the power receiving coil 410 may receive power by electromagnetic induction.

The power converting circuit 420 may include a rectifier circuit. An alternating current voltage and an alternating current may be applied to the power receiving coil 410 that receives power from the power transmitting coil 21. Because the communication module 430, the inputter 440, the main load 450, and the processor 470 of the electronic device 2 use direct current power, the power converting circuit 420 may be needed. Also, the power converting circuit 420 may include a DC-DC converter for applying appropriate power to individual components of the electronic device 2. The power converting circuit 420 may be implemented as a switched-mode power supply (SMPS). The SMPS may be a power supply device for converting and supplying alternating current power or direct current power through a switching operation.

The communication module 430 may communicate with the wireless power transmission apparatus 1. The communication module 430 may be implemented by various wireless communication technologies. For example, at least one of RF, infrared communication, Wi-Fi, Bluetooth, Zigbee, or NFC may be applied to the communication module 432. Preferably, the communication module 430 may be implemented as an NFC tag. The communication module 430 of the electronic device 2 is also referred to as a second communication module.

The inputter 440 may receive a command related to an operation of the electronic device 2 from a user. The inputter 440 may include at least one of a physical button, a touch button, or a dial. Also, the inputter 440 may be implemented as a touch screen.

The main load 450 means a component that consumes greatest power in the electronic device 2. For example, in a case in which the electronic device 2 is an electric kettle, the main load 450 may be a heat source such as a heater. In a case in which the electronic device 2 is a blender, the main load 450 may be a motor.

The processor 470 may be electrically connected to the components of the electronic device 2, and control the components. That is, the processor 470 may control the power converting circuit 420, the communication module 430, the inputter 440, and the main load 450. The processor 470 of the electronic device 2 is also referred to as a second processor.

Hereinafter, a structure of the coil assembly 20 included in the wireless power transmission apparatus 1 according to an embodiment of the disclosure will be described in detail.

Figure 6:
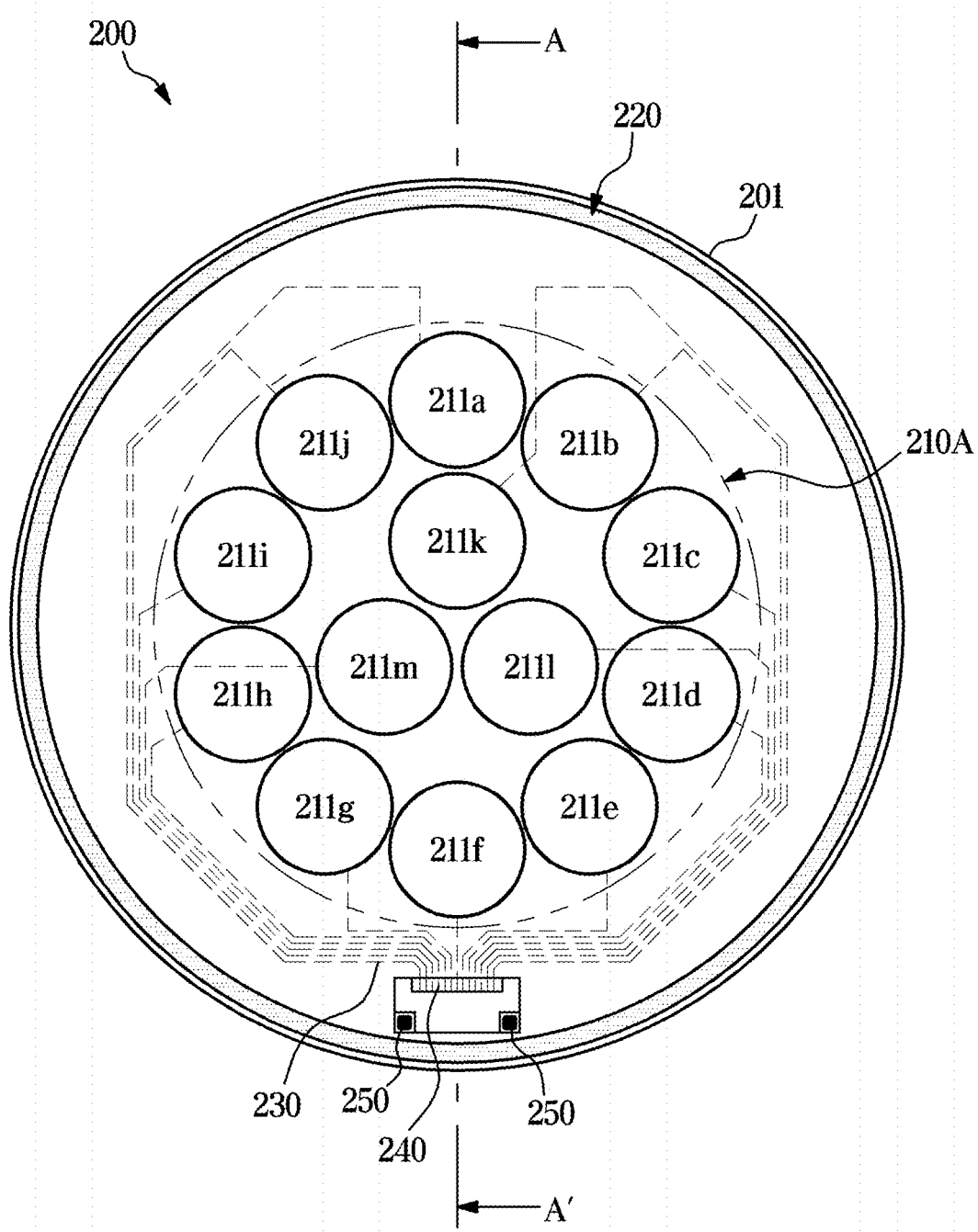
FIG. 6 illustrates a top view of a coil assembly including an antenna and Foreign Object Detection (FOD) coils formed in a layer according to an embodiment of the disclosure.
Figure 7:
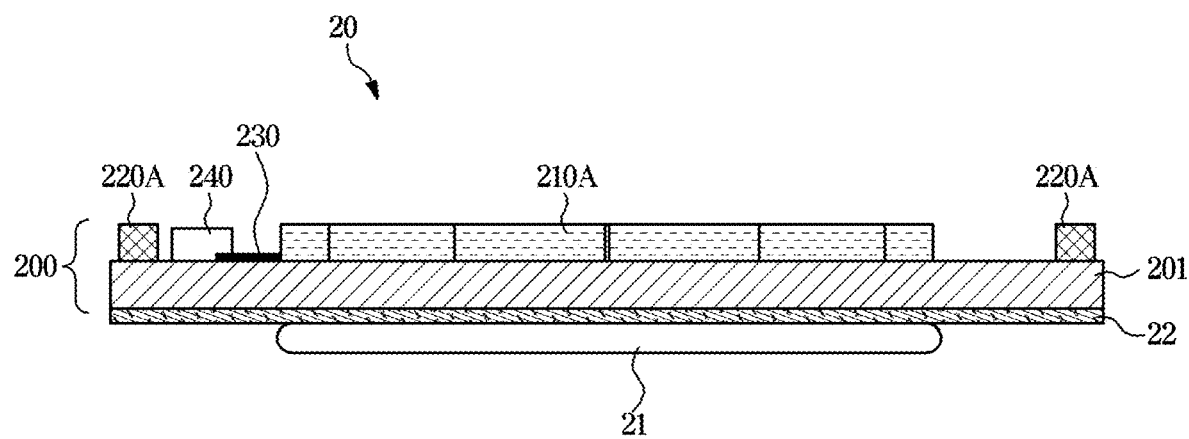
FIG. 7 illustrates a cross-sectional view of the coil assembly shown in FIG. 6 according to an embodiment of the disclosure.

FIG. 6 illustrates a top view of a coil assembly including an antenna and FOD coils formed in a layer according to an embodiment of the disclosure. FIG. 7 illustrates a cross-sectional view of the coil assembly shown in FIG. 6 according to an embodiment of the disclosure.

FIG. 7 shows a cross section of the printed circuit board 200 of FIG. 6, taken along line A-A'. Referring to FIGS. 6 and 7, the coil assembly 20 may include the power transmitting coil 21, the insulating sheet 22, and the printed circuit board 200. The printed circuit board 200 may be positioned between the plate 11 and the power transmitting coil 21, and may include a substrate 201. The printed circuit board 200 may include at least one layer in which the plurality of FOD coils 210 and the antenna 220 are formed.

In FIGS. 6 and 7, an example in which the plurality of FOD coils 210 and the antenna 220 form a single layer as an upper layer of the substrate 201 is shown. The printed circuit board 200 of FIGS. 6 and 7 is also referred to as a one-sided printed circuit board.

The antenna 220 may be formed outside a first area 210A at which the plurality of FOD coils 210 are formed in the upper layer of the substrate 201. In a lower layer of the substrate 201, the insulating sheet 22 may be provided. The insulating sheet 22 may prevent the power transmitting coil 21 from being electrified with the printed circuit board 200. Although not shown in the drawings, the insulating sheet 22 may be positioned between the printed circuit board 200 and the plate 11.

The plurality of FOD coils 210 and the antenna 220 may be printed as a pattern. The plurality of FOD coils 210 may be formed as an array pattern. For example, the plurality of FOD coils 210 may include a first FOD coil 211a, a second FOD coil 211b, a third FOD coil 211c, a fourth FOD coil 211d, a fifth FOD coil 211e, a sixth FOD coil 211f, a seventh FOD coil 211g, an eighth FOD coil 211h, a ninth FOD coil 211i, a tenth FOD coil 211j, an eleventh FOD coil 211k, a twelfth FOD coil 211l, and a thirteenth FOD coil 211m, which are formed in the upper layer of the substrate 201.

The plurality of FOD coils 210 may be spaced from each other without overlapping with each other. Each of the plurality of FOD coils 210 may be formed in a shape of a circle or a polygon, and may have a smaller size than that of the power transmitting coil 21. The plurality of FOD coils 210 may be formed at the first area 210A that is smaller than an area of the power transmitting coil 21. That is, the plurality of FOD coils 210 may cover the area of the power transmitting coil 21.

The antenna 220 may be formed at a second area 220A spaced from the plurality of FOD coils 210. Because the antenna 220 is spaced from the FOD coils 210, the antenna 220 may be suppressed from interfering with the FOD coils 210.

The antenna 220 may be formed in a shape of a circle or a polygon. A distance from a boundary of the second area 220A at which the antenna 220 is formed to a center of the substrate 201 may be equal to or greater than a radius of the power transmitting coil 21.

Because each of the plurality of FOD coils 210 has a smaller size than that of the power transmitting coil 21, coupling with a foreign object may be improved, and accuracy in detecting a foreign object may be raised. Also, because the plurality of FOD coils 210 are formed in an array pattern, a location of a foreign object may be more accurately detected. A location of a foreign object may be determined by comparing changes of output voltages or output currents from the individual FOD coils 210. For example, in a case in which a foreign material is located at a center of the eleventh FOD coil 211k, a change of an output voltage from the eleventh FOD coil 211k may be greatest, and changes of output voltages from the other neighboring FOD coils 211a, 211m, and 211l may be relatively small.

Accordingly, the processor 324 may determine that a foreign object is located on the eleventh FOD coil 211k.

The printed circuit board 200 may include a first terminal 240 to which the plurality of FOD coils 210 are connected and a second terminal 250 to which the antenna 220 is connected. The first terminal 240 may include a plurality of electrode pads corresponding to the number of the plurality of FOD coils 210. The second terminal 250 may include two electrode pads respectively connected to both ends of the antenna 220.

On the substrate 201, a line pattern 230 may be formed to connect the individual FOD coils 210 to the first terminal 240. The line pattern 230 may be formed to connect the individual FOD coils 210 in parallel to the first terminal 240.

The switch 321 included in the control circuit 320 may be connectable to the first terminal 240 or the second terminal 250. The switch 321 may be selectively connected to the first terminal 240 or the second terminal 250. By a switching operation of the switch 321, the plurality of FOD coils 210 or the antenna 220 may be connected to the control circuit 320.

Arrangement locations of the FOD coils 210 and the antenna 220 may vary depending on a design.

As such, by providing an integrated printed circuit board on which an antenna and FOD coils are formed together, a deviation problem that occurs upon assembling of a separate antenna circuit and a FOD coil circuit may be overcome. Accordingly, interference between an antenna and FOD coils may be reduced, and occurrence of antenna impedance mismatching upon manufacturing may be suppressed. Also, because a remaining space of a printed circuit board is used, an effect of cost reduction may be obtained.

Figure 8:
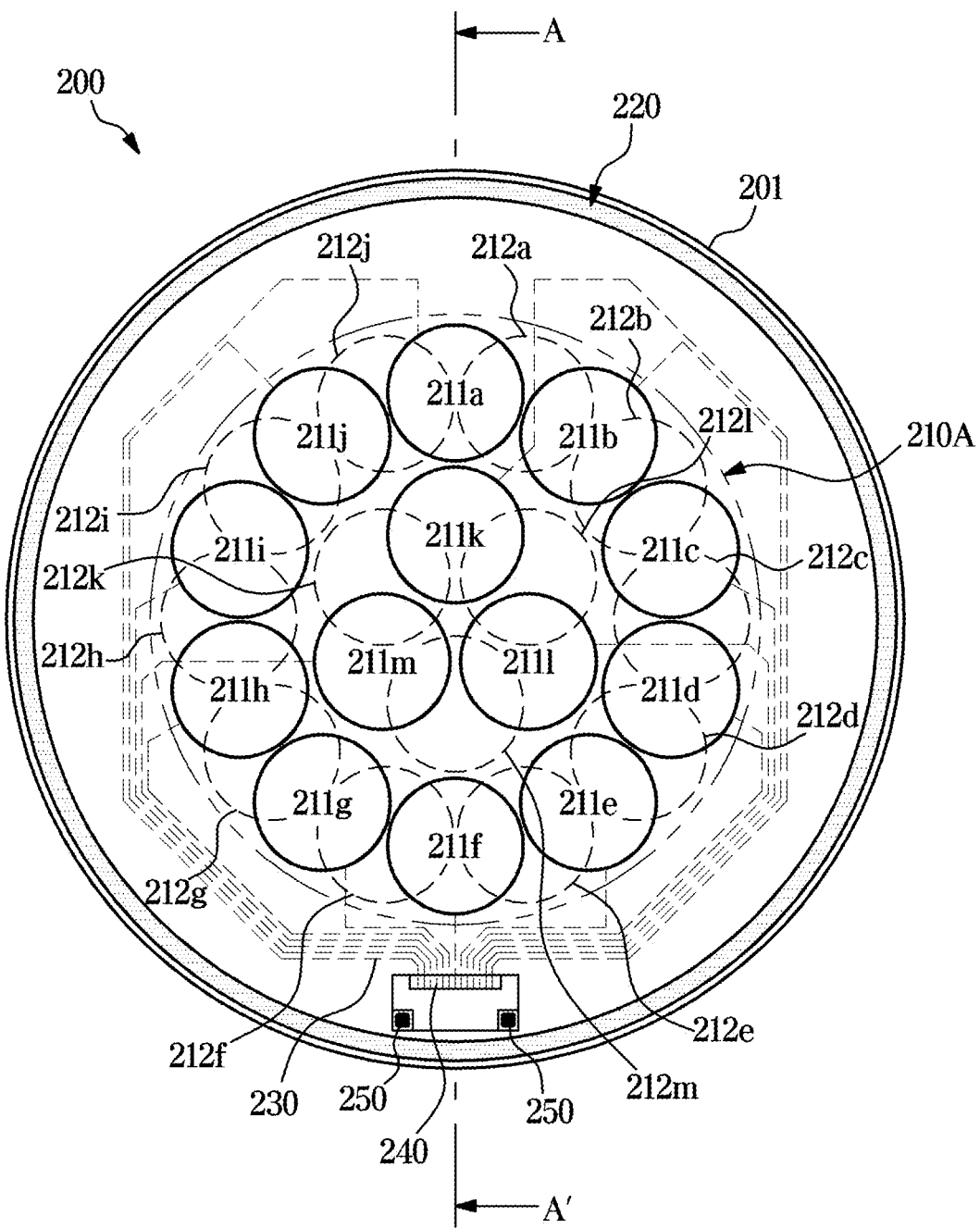
FIG. 8 illustrates a bottom view of a coil assembly including antennas and FOD coils formed in two layers according to an embodiment of the disclosure.
Figure 9:
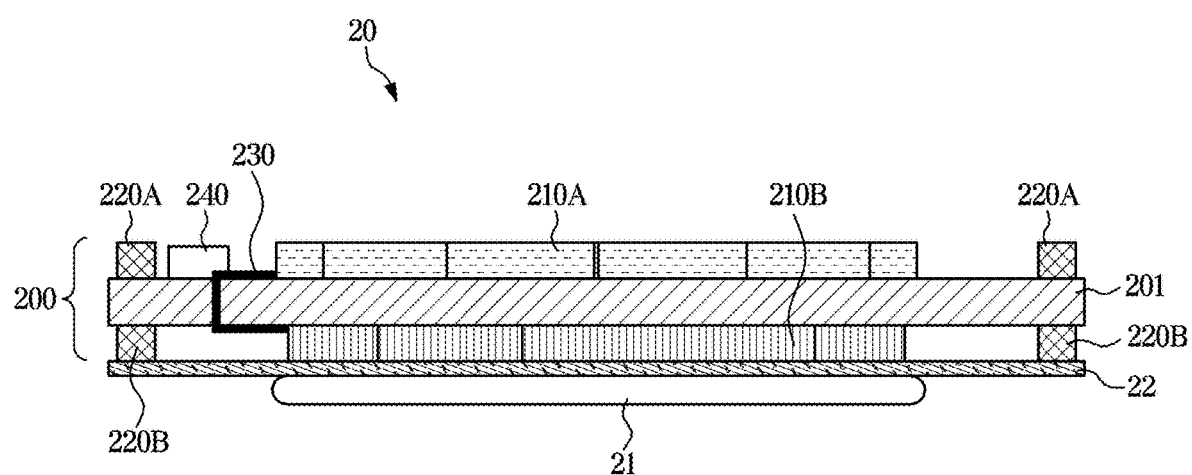
FIG. 9 illustrates a cross-sectional view of the coil assembly shown in FIG. 8 according to an embodiment of the disclosure.

FIG. 8 illustrates a bottom view of a coil assembly including antennas and FOD coils formed in two layers according to an embodiment of the disclosure. FIG. 9 illustrates a cross-sectional view of the coil assembly shown in FIG. 8 according to an embodiment of the disclosure.

FIG. 9 shows a cross section of the printed circuit board 200 of FIG. 8, taken along line A-A'. Referring to FIGS. 8 and 9, the plurality of FOD coils 210 and the antenna 220 may also form a single layer as a lower layer of the substrate 201. The printed circuit board 200 of FIGS. 8 and 9 may be also referred to as a double-sided printed circuit board.

The upper layer of the substrate 201 may be referred to as a first layer, and the lower layer of the substrate 201 may be referred to as a second layer. For example, the plurality of FOD coils 210 may include a fourteenth FOD coil 212a, a fifteenth FOD coil 212b, a sixteenth FOD coil 212c, a seventeenth FOD coil 212d, an eighteenth FOD coil 212e, a nineteenth FOD coil 212f, a twentieth FOD coil 212g, a twenty-first FOD coil 212h, a twenty-second FOD coil 212i, a twenty-third FOD coil 212j, a twenty-fourth FOD coil 212k, a twenty-fifth FOD coil 212l, and a twenty-sixth FOD coil 212m, which are formed in the lower layer of the substrate 201.

The FOD coils 211a to 211m formed in the upper layer of the substrate 201 may be referred to as 'first FOD coils', and the FOD coils 212a to 212m formed in the lower layer of the substrate 201 may be referred to as 'second FOD coils'. The antenna 220 formed in the upper layer of the substrate 201 may be referred to as a 'first antenna', and an antenna 220 formed in the lower layer of the substrate 201 may be referred to a 'second antenna'.

The plurality of second FOD coils 212a to 212m may be formed in an array pattern in the lower layer of the substrate 201 in such a way as to overlap with gaps between the plurality of first FOD coils 211a to 211m. Because the plurality of first FOD coils 211a to 211m overlap with the plurality of second FOD coils 212a to 212m in different layers, an area being incapable of detecting a foreign object may be removed, and any foreign object may be detected over the entire area through which wireless power is transmitted.

The first FOD coils 211a to 211m may be formed at the first area 210A having a size that is smaller than or equal to that of the power transmitting coil 21. The second FOD coils 212a to 212m may be formed at a third area 210B having a size that is smaller than or equal to that of the power transmitting coil 21. That is, the first FOD coils 211a to 211m and the second FOD coils 212a to 212m may cover the area of the power transmitting coil 21.

The first FOD coils 211a to 211m may be spaced from each other without overlapping with each other in the first layer, and the second FOD coils 212a to 212m may be spaced from each other without overlapping with each other in the second layer. Each of the first FOD coils 211a to 211m and the second FOD coils 212a to 212m may be formed in a shape of a circle or a polygon, and may have a smaller size than that of the power transmitting coil 21.

The first antenna 220 may be formed at the second area 220A spaced from the plurality of first FOD coils 211a to 211m. The second antenna 221 may be formed at a fourth area 220B spaced from the plurality of second FOD coils 212a to 212m. Each of the first antenna 220 and the second antenna 221 may be formed in a shape of a circle or a polygon.

A distance from each of a boundary of the second area 220A at which the first antenna 220 is formed and a boundary of the fourth area 220B at which the second antenna 221 is formed to the center of the substrate 201 may be equal to or greater than the radius of the power transmitting coil 21.

As shown in FIG. 6, in the upper layer of the substrate 201, the first terminal 240 to which the plurality of FOD coils 210 are connected and the second terminal 250 to which the antenna 220 is connected may be formed. The line pattern 230 connecting the individual FOD coils 210 to the first terminal 240 may be provided in both the upper and lower layers of the substrate 201. The line pattern 230 formed in the upper layer of the substrate 201 may be connected to the first FOD coils 211a to 211m, and the line pattern 230 formed in the lower layer of the substrate 201 may be connected to the second FOD coils 212a to 212m. Also, the line pattern 230 formed in the lower layer of the substrate 201 may penetrate the substrate 201 and be connected to the first terminal 240.

Also, the second antenna 221 may penetrate the substrate 201 and be connected to the second terminal 250 provided in the upper layer of the substrate 201.

The switch 321 included in the control circuit 320 may be connected to the first terminal 240 or the second terminal 250. By a switching operation of the switch 321, the plurality of FOD coils 210 or the antennas 220 and 221 may be electrically connected to the processor 324 of the control circuit 320.

On a lower side of the second layer, the insulating sheet 22 may be provided. The insulating sheet 22 may prevent the power transmitting coil 21 from being electrified with the printed circuit board 200. Although not shown in the drawings, the insulating sheet 22 may be positioned between the printed circuit board 200 and the plate 11.

Figure 10:
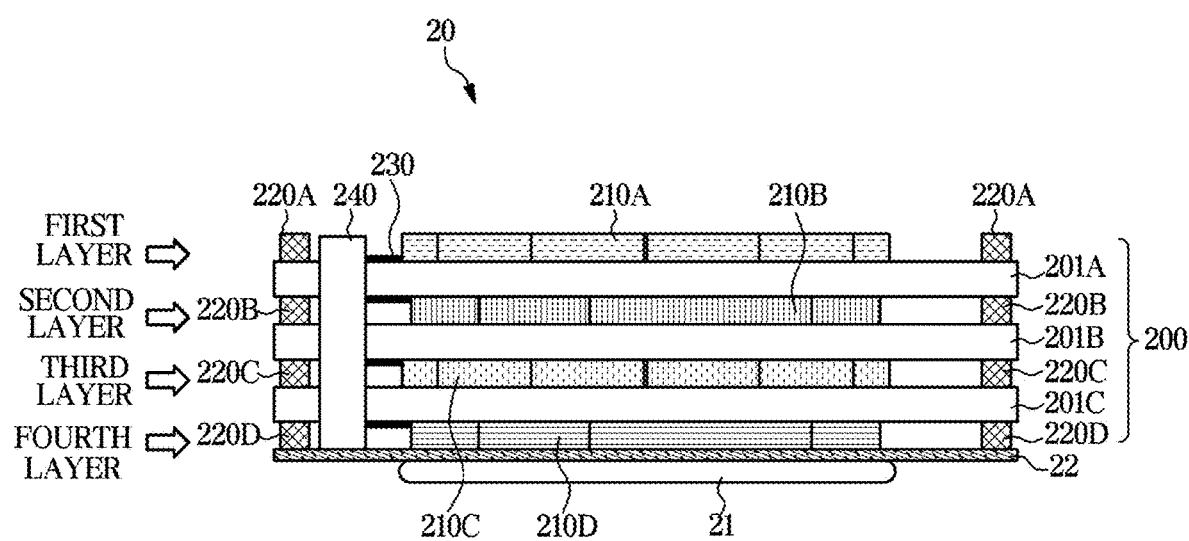
FIG. 10 illustrates a cross-sectional view of a coil assembly including antennas and FOD coils formed in four layers according to an embodiment of the disclosure.

FIG. 10 illustrates a cross-sectional view of a coil assembly including antennas and FOD coils formed in four layers according to an embodiment of the disclosure.

Referring to FIG. 10, the printed circuit board 200 may include a plurality of substrates, that is, a first substrate 201A, a second substrate 201B, and a third substrate 201C. The printed circuit board 200 of FIG. 10 may be also referred to as a multilayer printed circuit board.

The first substrate 201A, the second substrate 201B, and the third substrate 201C may be stacked. The first substrate 201A, the second substrate 201B, and the third substrate 201C may be molded with prepreg. An upper layer of the first substrate 201A may be referred to as a first layer, a middle layer between the first substrate 201A and the second substrate 201B may be referred to as a second layer, a middle layer between the second substrate 201B and the third substrate 201C may be referred to as a third layer, and a lower layer of the third substrate 201C may be referred to as a fourth layer.

In each of the first layer, the second layer, the third layer, and the fourth layer, the plurality of FOD coils 210 and the antenna 220 may be formed. The first layer may include the first area 210A at which the FOD coils 210 are formed, and the second area 220A at which the antenna 220 is formed. The second layer may include the third area 210B at which the FOD coils 210 are formed, and the fourth area 220B at which the antenna 220 is formed. The third layer may include a fifth area 210C at which the FOD coils 210 are formed, and a sixth area 220C at which the antenna 220 is formed. The fourth layer may include a seventh area 210D at which the FOD coils 210 are formed, and an eighth area 220D at which the antenna 220 is formed.

In each layer, the FOD coils 210 and the antenna 220 may be printed as a pattern. Also, the FOD coils 210 may have an array pattern. Each of the FOD coils 210 provided in each layer may be formed in a shape of a circle or a polygon, and may have a size that is smaller than that of the power transmitting coil 21. The antenna 220 provided in each layer may be in a shape of a circle or a polygon.

In each layer, an area at which the FOD coils 210 are positioned may be spaced from an area at which the antenna 220 is positioned. In each layer, the area at which the FOD coils 210 are positioned may have a size that is smaller than or equal to that of the power transmitting coil 21. In each layer, a distance from a boundary of the area at which the antenna 220 is positioned to a center of the first, second, or third substrate 201A, 201B, or 201C may be equal to or greater than the radius of the power transmitting coil 21.

The printed circuit board 200 may include the first terminal 240 to which the FOD coils 210 formed in each layer are connected. For example, the first terminal 240 may penetrate the first substrate 201A, the second substrate 201B, and the third substrate 201C. In each of the first layer, the second layer, the third layer, and the fourth layer, the line pattern 230 may be formed to connect the individual FOD coils 210 in parallel to the first terminal 240.

Although not shown in the drawings, the printed circuit board 200 may include the second terminal 250 to which the antenna 220 formed in each layer is connected. For example, the second terminal 250 may be provided in the first layer of the first substrate 201A. Antennas formed in the second layer, the third layer, and the fourth layer may penetrate the first, second, and third substrates 201A, 201B, and 201C and be connected to the second terminal 250.

Locations and shapes of the line pattern 230, the first terminal 240, and the second terminal 250 are not limited to the above-described example, and may vary depending on a design.

The switch 321 included in the control circuit 320 may be selectively connected to the first terminal 240 or the second terminal 250. By a switching operation of the switch 321, the plurality of FOD coils 210 or the antennas 220 formed in the multilayer may be connected to the control circuit 320.

On a lower side of the fourth layer, the insulating sheet 22 may be provided. The insulating sheet 22 may prevent the power transmitting coil 21 from being electrified with the printed circuit board 200. Although not shown in the drawings, the insulating sheet 22 may be positioned between the printed circuit board 200 and the plate 11.

The number of layers in which the FOD coils 210 and the antennas 220 are formed in the printed circuit board 200 is not limited to the above-described example. The number of layers in which the FOD coils 210 and the antennas 220 are formed may vary depending on a design of the printed circuit board 200.

As such, because the plurality of FOD coils 210 overlap with each other in different layers, an area being incapable of detecting a foreign object may be removed, and any foreign object may be detected over the entire area through which wireless power is transmitted.

Figure 11:
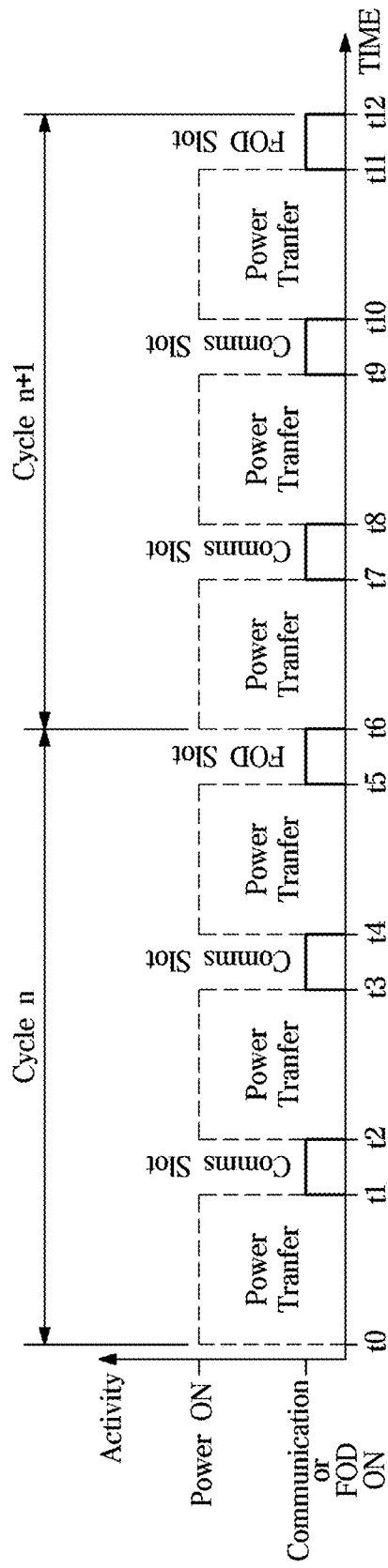
FIG. 11 illustrates a graph for describing a transfer cycle of wireless power according to an embodiment of the disclosure.
Figure 12:
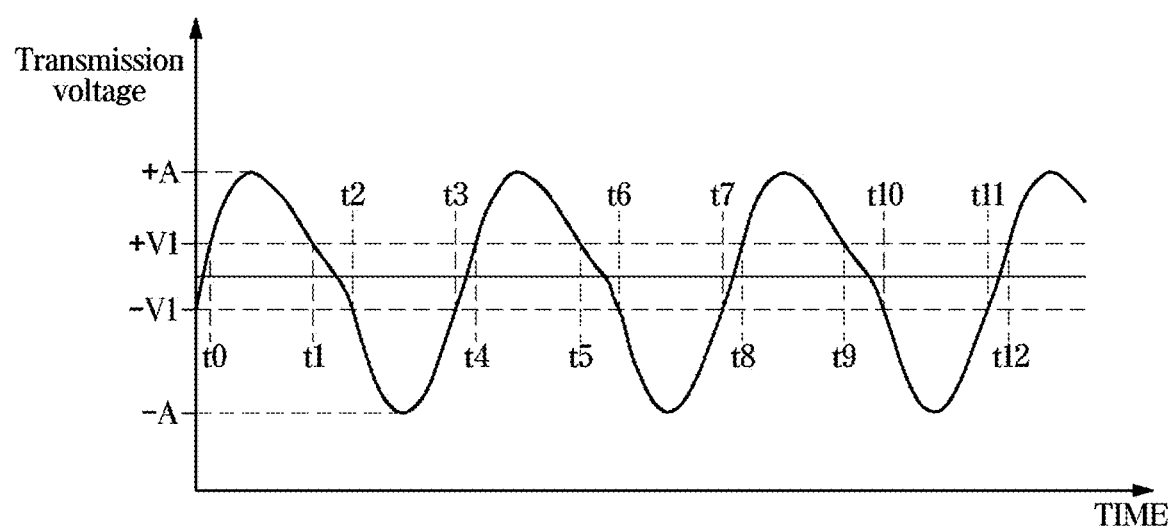
FIG. 12 illustrates a graph for describing relationship between a transfer cycle and an output voltage from a power transmitting coil according to an embodiment of the disclosure.

FIG. 11 illustrates a graph for describing a transfer cycle of wireless power according to an embodiment of the disclosure. FIG. 12 illustrates a graph for describing relationship between a transfer cycle and an output voltage from a power transmitting coil according to an embodiment of the disclosure.

Referring to FIG. 11, the processor 324 of the wireless power transmission apparatus 1 may sequentially and/or repeatedly perform wireless power transmission, communication connection check, and foreign object detection, based on transfer cycle information stored in the memory 323. The processor 324 of the wireless power transmission apparatus 1 may be connected to the antenna 220 or the FOD coils 210 by controlling the switch 321, based on the transfer cycle information stored in the memory 323.

The transfer cycle information may include an operation sequence configured with wireless power transmission, communication connection check, and foreign object detection. A transfer cycle may include a first operation slot for transmitting wireless power to the electronic device 2 for a first time period, a second operation slot for checking a communication connection to the electronic device 2 for a second time period, and a third operation slot for detecting a foreign object located on the plate 11 for a third time period.

The switch 321 of the control circuit 320 may be connected to the antenna 220 in the second operation slot, and connected to the FOD coils 210 in the third operation slot. For example, the processor 324 of the control circuit 320 may be connected to the antenna 220 at a time t1 by controlling the switch 321, and be disconnected from the antenna 220 at a time t2 by controlling the switch 321. Also, the processor 324 may be connected to the FOD coils 210 at a time t5 by controlling the switch 321, and be disconnected from the FOD coils 210 at a time t6 by controlling the switch 321.

Also, a transfer cycle may include one or more first operation slots, one or more second operation slots, and one or more third operation slots. The numbers of first operation slots, second operation slots, and third operation slots included in a transfer cycle may vary depending on a design.

For example, a first operation slot may be assigned to a time period from t0 to t1, a time period from t2 to t3, and a time period from t4 to t5. Also, a second operation slot may be assigned to a time period from t1 to t2 and a time period from t3 to t4, and a third operation slot may be assigned to a time period from t5 to t6. That is, the wireless power transmission apparatus 1 may transmit wireless power for the time period from t0 to t1, the time period from t2 to t3, and the time period from t4 to t5, check a communication connection to the electronic device 2 for the time period from t1 to t2 and the time period from t4 to t5, and detect a foreign object for the time period from t5 to t6.

A transfer cycle may be successively repeated. For example, a transfer cycle may be performed for a time period from the time t0 to the time t6, and then, the same transfer cycle may be again performed for a time period from the time t6 to the time t12.

Referring to FIG. 12, a waveform of a voltage output from the power transmitting coil 21 may appear as a sine wave. That is, an output voltage signal of the power transmitting coil 21 may have a constant cycle (for example, a time length from t1 to t5) and a constant amplitude (for example, A).

The processor 324 may be connected to the antenna 220 or the FOD coils 210 formed in at least one layer of the printed circuit board 200 by controlling the switch 321, based on a magnitude of an output voltage from the power transmitting coil 21. More specifically, in a case in which a magnitude of an output voltage from the power transmitting coil 21 is smaller than a predefined switching voltage, the processor 324 may connect the antenna 220 or the FOD coils 210 to the control circuit 320 by controlling the switch 321. In a case in which a magnitude of an output voltage from the power transmitting coil 21 is smaller than the predefined switching voltage, the processor 324 may be connected to the antenna 220 or the FOD coils 210 by controlling the switch 321, based on transfer cycle information stored in advance in the memory 323. For example, a magnitude of the predefined switching voltage may be V1, and the processor 324 may be connected to the antenna 220 by controlling the switch 321 for the time period from t1 to t2 and the time period from t3 to t4, which correspond to a time period for which a magnitude of an output voltage from the power transmitting coil 21 is smaller than V1. Also, the processor 324 may be connected to the FOD coils 210 by controlling the switch 321 for the time period from t5 to t6 which corresponds to a time period for which a magnitude of an output voltage from the power transmitting coil 21 is smaller than V1.

As such, the wireless power transmission apparatus 1 may connect the antenna 220 or the FOD coils 210 to the control circuit 320 in a case in which a magnitude of an output voltage from the power transmitting coil 21 is smaller than the predefined switching voltage, thereby reducing interference between the power transmitting coil 21, the antenna 220, and the FOD coils 210.

FIG. 13 illustrates a flowchart for describing a control method of a wireless power transmission apparatus according to an embodiment of the disclosure.

Referring to FIG. 13, the processor 324 of the wireless power transmission apparatus 1 may sense the electronic device 2 put on the driving areas M1 and M2 of the plate 11, in operation 1301. The processor 324 may sense the electronic device 2 based on a sensing signal transmitted from the device sensor 120 or a change in inductance of the power transmitting coil 21.

The wireless power transmission apparatus 1 may transmit wireless power to the electronic device 2, in operation 1302. More specifically, the processor 324 may control the driving circuit 310 to transmit wireless power from the power transmitting coil 21 to the electronic device 2.

The processor 324 may continue to monitor a magnitude of an output voltage from the power transmitting coil 21.

The processor 324 may determine a connection or disconnection between the printed circuit board 200 and the control circuit 320 based on a magnitude of an output voltage from the power transmitting coil 21.

In a case in which a magnitude of an output voltage from the power transmitting coil 21 is smaller than a predefined switching voltage, the processor 324 may connect the antenna 220 or the plurality of FOD coils 210 formed in at least one layer of the printed circuit board 200 to the control circuit 320 by controlling the switch 321.

In a case in which a magnitude of an output voltage from the power transmitting coil 21 is smaller than the predefined switching voltage, the processor 324 may be connected to the antenna 220 or the plurality of FOD coils 210 by controlling the switch 321, based on pre-stored transfer cycle information, in operations 1303 and 1304.

The processor 324 may determine whether to interrupt wireless power transmission based on whether communication with the electronic device 2 has been interrupted or whether a foreign object has been detected on the plate 11, in operation 1305 and 1306. More specifically, the processor 324 may determine a communication state with respect to the electronic device 2 based on a communication signal received through the antenna 220. For example, in a case in which a magnitude of the communication signal is smaller than a predefined reference value, the processor 324 may determine that communication with the electronic device 2 has been interrupted. The interruption of communication with the electronic device 2 may mean that the electronic device 2 has been removed from the plate 11. The processor 324 may control the driving circuit 310 to interrupt wireless power transmission, based on the interruption of communication with the electronic device 2.

Also, in a case in which the control circuit 320 is connected to the FOD coils 210, the processor 324 may control the driving circuit 310 to interrupt wireless power transmission, based on a change of an output voltage or an output current from the FOD coils 210. The processor 324 may determine whether a foreign object exists between the driving areas M1 and M2 of the plate 11 and the electronic device 2, based on a change of an output voltage or an output current from the FOD coils 210. In response to a determination that a foreign object exists, the processor 324 may determine an interruption of wireless power transmission, and control the driving circuit 310 to apply no current to the power transmitting coil 21.

As described above, the wireless power transmission apparatus and the method for controlling the wireless power transmission apparatus may include a structure in which an antenna for communicating with an electronic device and FOD coils for detecting a foreign object are formed together on a printed circuit board.

By providing an integrated printed circuit board on which an antenna and FOD coils are formed together, the wireless power transmission apparatus and the method for controlling the wireless power transmission apparatus may solve a deviation problem that occurs upon assembling of a separate antenna circuit and a FOD coil circuit. Accordingly, interference between the antenna and the FOD coils may be reduced, and occurrence of antenna impedance mismatching upon manufacturing may be suppressed. Also, because a remaining space of the printed circuit board is used, an effect of cost reduction may be obtained.

The wireless power transmission apparatus and the method for controlling the wireless power transmission apparatus may selectively connect the antenna or the FOD coils formed on the integrated printed circuit board to a control circuit. Accordingly, interference between the antenna and the FOD coils may be prevented.

Meanwhile, the disclosed embodiments of the disclosure may be implemented in the form of a storage medium storing instructions that are executable by a computer. The instructions may be stored in the form of program codes, and when executed by the processor, the instructions may generate a program module to perform operations of the disclosed embodiments of the disclosure.

A machine-readable storage medium may be provided in the form of a non-transitory storage medium, wherein the term 'non-transitory storage medium' means that it is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloadable or uploadable) online via an application store (e.g., PLAYSTORE) or between two user devices (e.g., smart phones) directly. When distributed online, at least part of the computer program product (e.g., a downloadable app) may be temporarily generated or at least temporarily stored in the machine-readable storage medium, such as a memory of the manufacturer's server, a server of the application store, or a relay server.

Although the present disclosure has been described with various embodiments, various changes and modifications may be suggested to one skilled in the art. It is intended that the present disclosure encompass such changes and modifications as fall within the scope of the appended claims.

What is claimed is:

1. A wireless power transmission apparatus comprising:
   a housing;
   a plate coupled with an upper portion of the housing;
   a power transmitting coil positioned inside the housing and configured to transmit wireless power to an electronic device that is positioned on the plate;
   a printed circuit board positioned between the plate and the power transmitting coil, and comprising:
     at least one antenna;
     an upper layer in which a plurality of first Foreign Object Detection (FOD) coils are formed; and
     a lower layer in which a plurality of second FOD coils are formed as an array pattern in the lower layer in such a way as to overlap with gaps between the plurality of first FOD coils;
   a processor electrically connected to the power transmitting coil and the printed circuit board; and
   a switch configured to form a first connection between the antenna and the processor or form a second connection between the plurality of first FOD coils, the plurality of second FOD coils, and the processor.

2. The wireless power transmission apparatus of claim 1, wherein the printed circuit board further comprises:
   a first terminal to which the plurality of first FOD coils and the plurality of second FOD coils are connected; and
   a second terminal to which the at least one antenna is connected,
   wherein the switch is connectable to the first terminal or the second terminal.

3. The wireless power transmission apparatus of claim 2, wherein the processor is configured to control the switch to connect to the first terminal or the second terminal based on whether a magnitude of an output voltage from the power transmitting coil is smaller than a predefined switching voltage.

4. The wireless power transmission apparatus of claim 2, wherein the processor is configured to control the switch to connected to the first terminal or the second terminal, based on transfer cycle information stored in a memory included in the wireless power transmission apparatus.

5. The wireless power transmission apparatus of claim 2, wherein the processor is further configured to:
   determine a communication state with respect to the electronic device based on a communication signal received through the at least one antenna, and
   determine an interruption of wireless power transmission to the electronic device, based on an interruption of communication with the electronic device.

6. The wireless power transmission apparatus of claim 2, wherein the processor is further configured to determine an interruption of wireless power transmission to the electronic device, based on a change of an output voltage or an output current from the plurality of first FOD coils and the plurality of second FOD coils.

7. The wireless power transmission apparatus of claim 1, wherein each of the plurality of first FOD coils and the plurality of second FOD coils is:
   formed in a shape of a circle or a polygon,
   a smaller size than a size of the power transmitting coil, and
   formed at a first area that is smaller than or equal to an area of the power transmitting coil.

8. The wireless power transmission apparatus of claim 7, wherein the at least one antenna is:
   formed in a shape of a circle or a polygon, and
   formed at a second area spaced from the first area.

9. The wireless power transmission apparatus of claim 1, further comprising an insulating sheet provided between the printed circuit board and the power transmitting coil or between the printed circuit board and the plate.

10. The wireless power transmission apparatus of claim 1, wherein:
    the printed circuit board comprises:
      a first antenna formed outside a first area at which the plurality of first FOD coils are formed, in the upper layer; and
      a second antenna formed outside a second area at which the plurality of second FOD coils are formed, in the lower layer.

11. The wireless power transmission apparatus of claim 10, wherein the printed circuit board further comprises:
    a first terminal through which the plurality of first FOD coils are connected to the plurality of second FOD coils; and
    a second terminal through which the first antenna is connected to the second antenna,
    wherein the switch is configured to connect to the first terminal or the second terminal.

12. The wireless power transmission apparatus of claim 1, wherein the processor is further configured to sense that the electronic device is positioned on a driving area of the plate.

13. A method for controlling a wireless power transmission apparatus, the wireless power transmission apparatus including a plate, a power transmitting coil, and a printed circuit board provided between the plate and the power transmitting coil, the method comprising:

sensing an electronic device that is positioned on a driving area of the plate;

transmitting wireless power to the electronic device by using the power transmitting coil; and controlling a switch to connect to an antenna or a plurality of first Foreign Object Detection (FOD) coils and a plurality of second FOD coils, wherein the plurality of first FOD coils and the antenna are formed in an upper layer of the printed circuit board, and the plurality of second FOD coils are formed in a lower layer of the printed circuit board.

14. The method of claim 13, wherein the controlling of the switch comprises:

switching a connection between the antenna and a processor to a connection between the plurality of first FOD coils, the plurality of second FOD coils, and the processor based on whether a magnitude of an output voltage from the power transmitting coil is smaller than a predefined switching voltage.

15. The method of claim 13, wherein the controlling of the switch comprises:

switching a connection between the antenna and a processor to a connection between the plurality of first FOD coils, the plurality of second FOD coils, and the processor, based on pre-stored transfer cycle information.

16. The method of claim 13, wherein the controlling of the switch comprise:

forming a first connection between the antenna and a processor; or forming a second connection between the plurality of first FOD coils, the plurality of second FOD coils and the processor.

17. The method of claim 13, further comprising:

determining a communication state with respect to the electronic device based on a communication signal received through the antenna, and determining an interruption of wireless power transmission to the electronic device, based on an interruption of communication with the electronic device.

18. The method of claim 13, further comprising:

determining an interruption of wireless power transmission to the electronic device, based on a change of an output voltage or an output current from the plurality of first FOD coils and the plurality of second FOD coils.

19. The method of claim 13, further comprising:

connecting the switch to a first terminal or a second terminal of the printed circuit board, wherein the plurality of first FOD coils and the plurality of second FOD coils are connected to the first terminal, and wherein the antenna is connected to the second terminal.

\* \* \* \* \*